US012565198B2

(12) United States Patent
Chiba et al.

(10) Patent No.: US 12,565,198 B2
(45) Date of Patent: Mar. 3, 2026

(54) IN-VEHICLE SYSTEM

(71) Applicant: TOYOTA JIDOSHA KABUSHIKI KAISHA, Toyota (JP)

(72) Inventors: Hiroya Chiba, Fuji (JP); Takehiko Hanada, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 18/678,671

(22) Filed: May 30, 2024

(65) Prior Publication Data

US 2024/0409087 A1 Dec. 12, 2024

(30) Foreign Application Priority Data

Jun. 7, 2023 (JP) ................................. 2023-094231

(51) Int. Cl.
*B60W 30/06* (2006.01)
*B62D 15/02* (2006.01)

(52) U.S. Cl.
CPC ......... *B60W 30/06* (2013.01); *B62D 15/0285* (2013.01)

(58) Field of Classification Search
CPC ............................ B60W 30/06; B62D 15/0285
See application file for complete search history.

(56) References Cited

U.S. PATENT DOCUMENTS

2010/0256836 A1* 10/2010 Mudalige ................. G08G 1/22
701/25
2017/0010124 A1* 1/2017 Reisman .......... G08G 1/096725

2017/0291603 A1* 10/2017 Nakamura ............ B60W 30/09
2020/0050212 A1* 2/2020 Mimura ............ B60W 30/0956
2020/0148196 A1* 5/2020 Lim ...................... G08G 1/0125
2020/0225677 A1* 7/2020 Tanaka ............... G01C 21/3415
2020/0262418 A1* 8/2020 Lin ........................ G08G 1/143
2020/0262453 A1* 8/2020 Mimura ................ G08G 1/202
2020/0276982 A1* 9/2020 Shoda ................... B60W 30/06
2020/0282977 A1* 9/2020 Hara .................. B62D 15/0285
2020/0312144 A1* 10/2020 Noguchi ................ G08G 1/143
2020/0387153 A1* 12/2020 Noguchi .............. G05D 1/0022
2021/0107513 A1* 4/2021 Goto ..................... B60W 30/09
2021/0107522 A1* 4/2021 Goto ................. B60W 60/0011

FOREIGN PATENT DOCUMENTS

JP 2005-182504 A 7/2005
JP 2007-010628 A 1/2007
JP 2020-080142 A 5/2020

* cited by examiner

*Primary Examiner* — Lindsay M Low
*Assistant Examiner* — Susan E Scharpf
(74) *Attorney, Agent, or Firm* — Dinsmore & Shohl LLP

(57) ABSTRACT

The present disclosure is directed to an in-vehicle system mounted on a vehicle. The in-vehicle system includes: one or more processors configured to acquire a target trajectory of the vehicle to a destination in a predetermined area; and one or more memories configured to store information of a vehicle parameter contributing to a passing region of the vehicle. The one or more processors are further configured to acquire information on a base trajectory that is a trajectory to the destination in the predetermined area and does not depend on the vehicle parameter. The one or more processors are further configured to acquire the target trajectory specific to the vehicle by correcting the base trajectory based on the vehicle parameter.

5 Claims, 6 Drawing Sheets

<EXAMPLE OF
VEHICLE PARAMETER PV>

MG: MARGIN WIDTH

X

110 — COMMUNICATION DEVICE

120 — PROCESSOR

130 — STORAGE DEVICE

140 — MANAGEMENT PROGRAM

150 — MAP INFORMATION

160 — MANAGEMENT INFORMATION

200 — BASE TRAJECTORY MAP

100: MANAGEMENT SYSTEM

IN-VEHICLE SYSTEM

CROSS-REFERENCES TO RELATED APPLICATION

The present disclosure claims priority to Japanese Patent Application No. 2023-094231, filed on Jun. 7, 2023, the contents of which application are incorporated herein by reference in their entirety.

TECHNICAL FIELD

The present disclosure relates to a technique for acquiring a target trajectory suitable for a vehicle.

BACKGROUND ART

Patent Literature 1 discloses a technique related to parking of an autonomous traveling vehicle. A parking control apparatus calculates a travel trajectory to a parking space based on sensor data collected from a variety of sensors in a parking lot and vehicle information (a vehicle type and the like) received from the autonomous traveling vehicle. The parking control apparatus provides the calculated travel trajectory to the autonomous traveling vehicle. The autonomous traveling vehicle autonomously travels to the parking space in accordance with the travel trajectory received from the parking control apparatus and is parked in the parking space.

List of Related Art

Patent Literature 1: Japanese Laid-Open Patent Application No. JP-2020-080142

SUMMARY

According to the technique disclosed in the above-mentioned Patent Literature 1, the parking control apparatus outside the vehicle receives the vehicle information (the vehicle type and the like) from the vehicle, calculates the travel trajectory based on the received vehicle information, and provides the calculated travel trajectory to the vehicle. The parking control apparatus needs to support a wide variety of vehicles that use the parking lot. In order to set an appropriate travel trajectory for each of the wide variety of vehicles, a complicated algorithm and a huge travel trajectory map are required. Therefore, the processing load on the parking control apparatus is increased. It may be conceivable to limit contents of the vehicle information in order to reduce the processing load, but in this case, it is not possible to generate an appropriate travel trajectory sufficiently considering individual characteristics of each vehicle, which results in decrease in the accuracy of the vehicle travel. On the other hand, when the contents of the vehicle information are increased in order to sufficiently consider all the individual characteristics of all the vehicles, the algorithm and the travel trajectory map become exponentially complicated, and thus the processing load also increases exponentially. Furthermore, it is necessary to update the algorithm and the travel trajectory maps every time a new vehicle type is released.

An object of the present disclosure relates to a technique capable of distributing load when acquiring a target trajectory suitable for a vehicle.

An aspect of the present disclosure is directed to an in-vehicle system mounted on a vehicle.

The in-vehicle system includes:

one or more processors configured to acquire a target trajectory of the vehicle to a destination in a predetermined area; and one or more memories configured to store information of a vehicle parameter contributing to a passing region of the vehicle.

The one or more processors acquire information on a base trajectory that is a trajectory to the destination in the predetermined area and does not depend on the vehicle parameter.

The one or more processors acquire the target trajectory specific to the vehicle by correcting the base trajectory based on the vehicle parameter.

According to the present disclosure, the in-vehicle system mounted on the vehicle acquires the base trajectory that does not depend on the vehicle parameter. Then, the in-vehicle system corrects the base trajectory based on the vehicle parameter, thereby acquiring a suitable target trajectory specific to the vehicle. Since the in-vehicle system corrects the base trajectory to the target trajectory in consideration of the vehicle parameter, there is no need for a system outside the in-vehicle system to consider the vehicle parameter. Therefore, it is possible to distribute the load when acquiring the target trajectory suitable for the vehicle.

DETAILED DESCRIPTION

1. Vehicle Control in Predetermined Area

Controlling a vehicle 1 in a predetermined area AR will be considered. Examples of the predetermined area AR include a parking lot, a factory, a site of a facility, a city (a smart city), and the like. In the predetermined area AR, the vehicle 1 is controlled to travel to a set destination. The vehicle 1 may be an autonomous driving vehicle.

Figure 1:
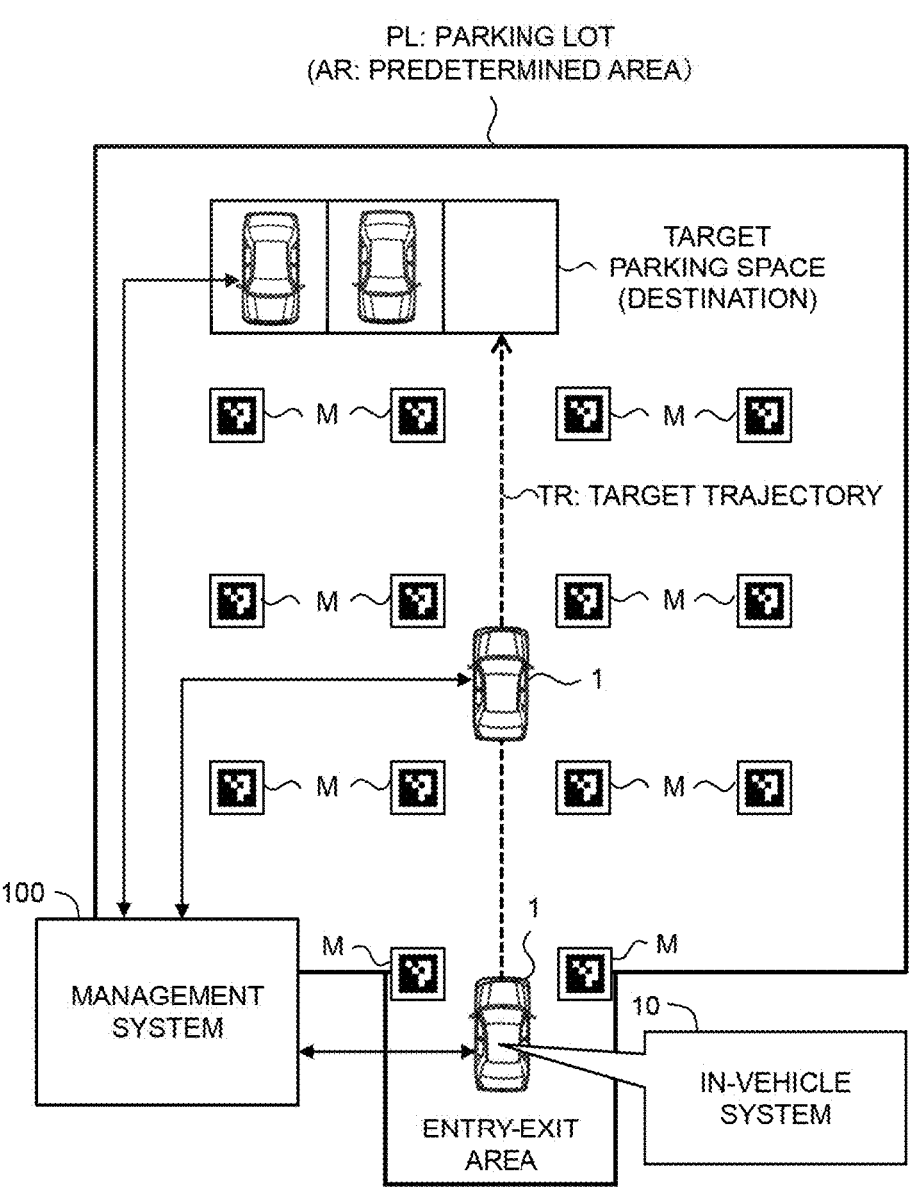
FIG. 1 is a conceptual diagram for explaining an example of vehicle control in a predetermined area according to an embodiment.

FIG. 1 is a conceptual diagram for explaining an example of the control of the vehicle 1 in the predetermined area AR. In the example shown in FIG. 1, the predetermined area AR is a parking lot PL. The parking lot PL provides an automated valet parking (AVP) service. The vehicle 1 is equipped with a function of performing the automated valet parking, and is able to automatically travel at least in the parking lot PL.

An in-vehicle system 10 is mounted on the vehicle 1 and controls the vehicle 1. More specifically, the in-vehicle system 10 recognizes a situation around the vehicle 1 using a recognition sensor (for example, a camera) mounted on the vehicle 1. The in-vehicle system 10 makes the vehicle 1 travel safely while recognizing the situation around the vehicle 1. In addition, a plurality of markers M (landmarks) are arranged in the parking lot PL. The marker M is used for guiding the vehicle 1 in the parking lot PL. For example, the in-vehicle system 10 acquires an image of the surroundings by using a camera and recognizes the marker M based on the image. Then, based on a result of recognition of the marker M, the in-vehicle system 10 performs localization processing for estimating a position of the vehicle 1 in the parking lot PL with high accuracy. The in-vehicle system 10 makes the vehicle 1 automatically travel in the parking lot PL based on the estimated vehicle position.

A management system 100 is a system that manages the parking lot PL (the predetermined area AR) and the automated valet parking, and is disposed outside the vehicle 1. The management system 100 is able to communicate with each vehicle 1 in the parking lot PL. The management system 100 may remotely operate each vehicle 1 in the parking lot PL.

An entry (check-in) process is as follows. The vehicle 1 stops at an entry area. The management system 100 allocates an available parking space to the vehicle 1. The allocated available parking space is a target parking space (i.e., a destination) for the vehicle 1 at the time of the entry. Then, a target trajectory TR (target route) from the entry area to the target parking space in the parking lot PL is set. A method of setting the target trajectory TR will be described in detail later. The in-vehicle system 10 acquires information on the target trajectory TR to the target parking space. The management system 100 issues an entry instruction to the in-vehicle system 10. In response to the entry instruction, the in-vehicle system 10 makes the vehicle 1 travel to the target parking space in accordance with the target trajectory TR. That is, the in-vehicle system 10 controls the vehicle 1 so as to follow the target trajectory TR while estimating the vehicle position. Then, the in-vehicle system 10 makes the vehicle 1 be parked in the target parking space.

An exist (check-out) process is as follows. At the time of the exit process, a designated exit area is a destination for the vehicle 1. A target trajectory TR from the parking space to the exist area in the parking lot PL is set. A method of setting the target trajectory TR will be described in detail later. The in-vehicle system 10 acquires information on the target trajectory TR to the exit area. The management system 100 issues an exit instruction to the in-vehicle system 10. In response to the exit instruction, the in-vehicle system 10 makes the vehicle 1 travel to the exit area in accordance with the target trajectory TR. That is, the in-vehicle system 10 controls the vehicle 1 so as to follow the target trajectory TR while estimating the vehicle position. Then, the in-vehicle system 10 makes the vehicle 1 stop in the exit area.

2. Setting Target Trajectory in Consideration of Vehicle Parameter

It is desirable that the vehicle 1 travels safely in the predetermined area AR. More specifically, it is desired that the vehicle 1 reaches the destination without protruding from a roadway and without making contact with an obstacle.

Figure 2:
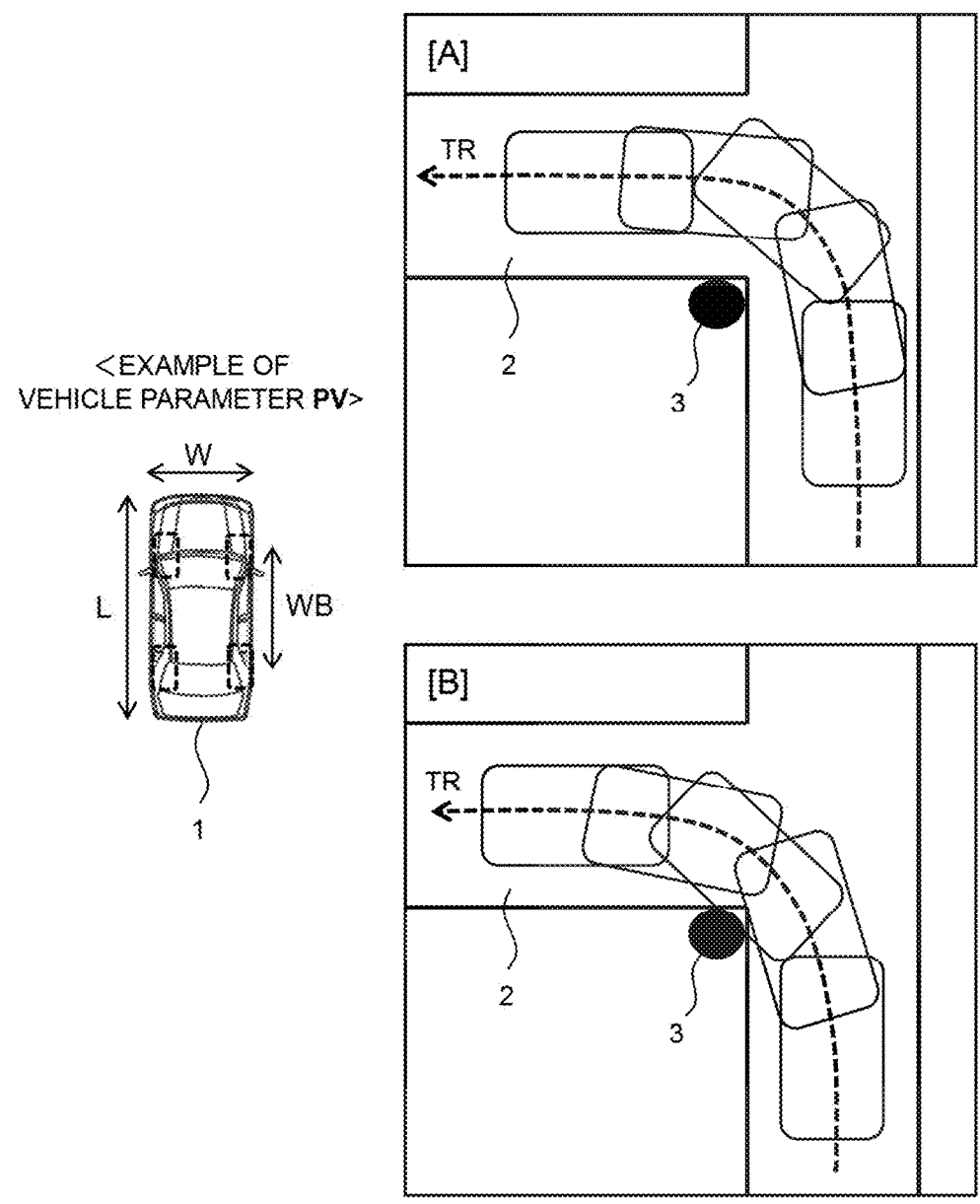
FIG. 2 is a conceptual diagram for explaining a vehicle parameter and a target trajectory according to an embodiment.

FIG. 2 shows a scene in which the vehicle 1 makes a left turn in the predetermined area AR. In an example [A] in FIG. 2, the vehicle 1 turns to the left without protruding from a roadway 2 and without making contact with an obstacle 3.

On the other hand, in an example [B] in FIG. 2, the vehicle 1 protrudes from the roadway 2 and makes contact with the obstacle 3. It is desirable to set a suitable target trajectory TR in advance so as to avoid the situation shown in the example [B]. For this purpose, it is necessary to set the target trajectory TR in consideration of a region through which the vehicle 1 (i.e., a vehicle body) passes. The region through which the vehicle 1 (i.e., a vehicle body) passes is hereinafter referred to as a "passing region."

A vehicle parameter PV is a parameter that contributes to the passing region of the vehicle 1. For example, the vehicle parameter PV includes a vehicle length L, a vehicle width W, a wheel base WB, a tread width, and the like of the vehicle 1. The vehicle parameter PV may include an installation position and a size of an external component such as a mirror, a decorative part, and the like of the vehicle 1. The vehicle parameter PV may include a steering method (2WS or 4WS) of the vehicle 1. The vehicle parameter PV may include a weight of the vehicle 1. The vehicle parameter PV may include a tire performance of the vehicle 1. The weight and the tire performance of the vehicle 1 affect a steering performance of the vehicle 1. It can be said that the vehicle parameter PV represents "individuality" and "characteristics" of the vehicle 1.

The passing region of the vehicle 1 is determined by the vehicle parameter PV. Considering the passing region makes it possible to set the target trajectory TR so that the vehicle 1 is able to travel safely in the predetermined area AR. That is, it is possible to set the target trajectory TR suitable for the vehicle 1 based on the vehicle parameter PV. The vehicle parameter PV may be different for each vehicle 1. Therefore, the target trajectory TR suitable for the vehicle 1 may also be different for each vehicle 1.

Hereinafter, a method of setting a suitable target trajectory TR for each vehicle 1 in consideration of the vehicle parameter PV will be described.

Figure 3:
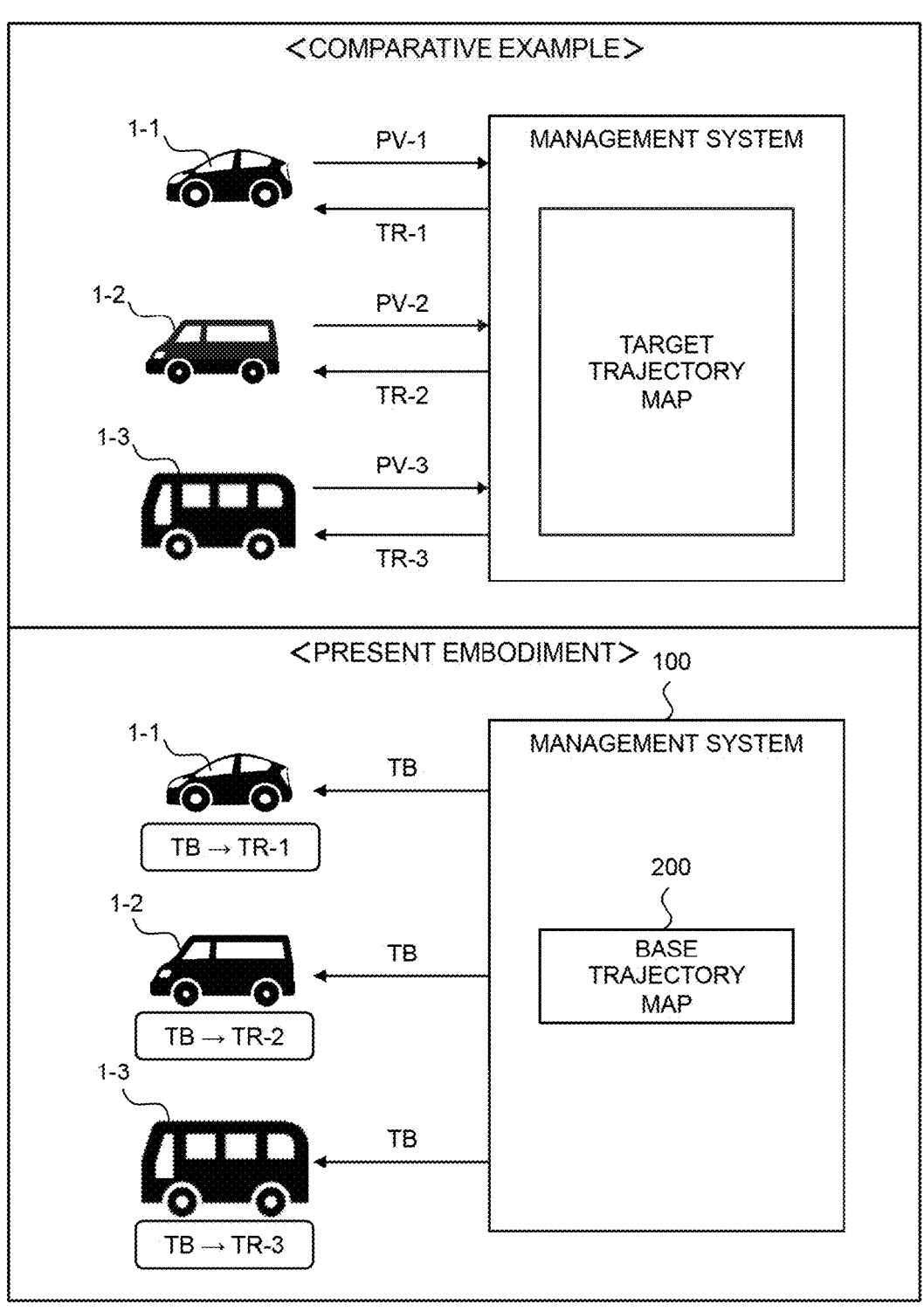
FIG. 3 is a conceptual diagram for explaining target trajectory setting methods according to a comparative example and an embodiment.

FIG. 3 is a conceptual diagram for explaining the target trajectory setting method according to a comparative example and the present embodiment. A difference in technical concept between the comparative example and the present embodiment will be described with reference to FIG. 3.

2-1. Comparative Example

First, the comparative example will be described. In the comparative example, a management system determines a suitable target trajectory TR for each vehicle 1. The target trajectory TR is a trajectory from a point of departure to a destination of the vehicle 1 in the predetermined area AR. As described above, the target trajectory TR suitable for the vehicle 1 depends on the vehicle parameter PV of the vehicle 1.

For example, the management system is provided with a target trajectory map for determining the target trajectory TR. Input data to the target trajectory map include the vehicle parameter PV in addition to a pair of the point of departure and the destination of the vehicle 1. The target trajectory map indicates a correspondence relationship between the input data and the suitable target trajectory TR. That is, the target trajectory map is configured to output the suitable target trajectory TR according to the input data. Such the target trajectory map is generated in advance based on, for example, actual travel data of a wide variety of vehicles 1 in the predetermined area AR.

The management system receives vehicle parameters PV-i from various vehicles 1-i (i=1, 2, 3 . . . ) via communication.

The management system also allocates a destination to the vehicle 1-*i*. The management system inputs the input data including the vehicle parameter PV-i and the pair of the point of departure and the destination into the target trajectory map, thereby obtaining the target trajectory TR-i for the vehicle 1-*i*. Then, the management system provides the target trajectory TR-i to each vehicle 1-*i* through communication. Each vehicle 1-*i* travels in accordance with the target trajectory TR-i determined by the management system.

In the case of this comparative example, the management system needs to support all of a wide variety of vehicles 1-*i* that use the predetermined area AR (for example, the parking lot PL). In order to set the suitable target trajectory TR-i for each of the wide variety of vehicles 1-*i*, a huge target trajectory map and a complicated algorithm are required. Therefore, the processing load on the management system increases.

In order to reduce the processing load, it may be conceivable to limit the contents (items) of the vehicle parameter PV-i to be considered by the management system. However, if the contents (items) of the vehicle parameter PV-i to be considered are limited, it is not possible to generate a suitable target trajectory TR-i sufficiently considering individual characteristics of each vehicle 1-*i*. As a result, accuracy of travel of the vehicle 1-*i* in the predetermined area AR is decreased.

On the other hand, if the contents (items) of the vehicle parameter PV-i are increased in order to sufficiently consider all the individual characteristics of all the vehicles 1-*i*, the target trajectory map and the algorithm become exponentially complicated. As a result, the processing load on the management system also increases exponentially. Furthermore, it is necessary to update the algorithm and the target trajectory map every time a new vehicle type is released.

Moreover, a communication standard for transmitting the vehicle parameter PV-i from the vehicle 1-*i* to the management system is not necessarily designed to cover all kinds of the vehicle parameters PV-i. There is a possibility that the contents of the vehicle parameter PV-i that can be transmitted from the vehicle 1-*i* to the management system are limited. In this case also, it is not possible to generate a suitable target trajectory TR-i sufficiently considering individual characteristics of each vehicle 1-*i*. As a result, the accuracy of travel of the vehicle 1-*i* in the predetermined area AR is decreased.

2-2. Present Embodiment

The management system 100 according to the present embodiment does not determine a suitable target trajectory TR for each vehicle 1. The management system 100 determines only a common target trajectory TR that does not depend on the vehicle parameter PV of the vehicle 1. The common target trajectory TR that does not depend on the vehicle parameter PV is hereinafter referred to as a "base trajectory TB." The base trajectory TB depends on a pair of a point of departure and a destination of the vehicle 1, but does not depend on the vehicle parameter PV.

For example, the management system 100 has a base trajectory map 200 for determining the base trajectory TB. Input data to the base trajectory map 200 include a pair of a point of departure and a destination of the vehicle 1, and do not include the vehicle parameter PV. The base trajectory map 200 indicates a correspondence relationship between the input data and the base trajectory TB. That is, the base trajectory map 200 is configured to output the base trajectory TB from the point of departure to the destination (for example, the target parking space) in the predetermined area AR. The base trajectory TB is set in advance for each pair of the point of departure and the destination. For example, the base trajectory TB is set along a center line of the roadway.

There is no need for the management system 100 to receive a wide variety of vehicle parameters PV-i from a wide variety of vehicles 1-*i* (i=1, 2, 3 . . . ). The management system 100 allocates a destination to the vehicle 1-*i*. The management system 100 inputs the pair of the point of departure and the destination into the base trajectory map 200, thereby obtaining the base trajectory TB that does not depend on the vehicle parameter PV-i. Then, the management system 100 provides the base trajectory TB to the vehicle 1-*i* through communication.

The in-vehicle system 10-*i* of the vehicle 1-*i* communicates with the management system 100 and acquires information on the base trajectory TB from the management system 100. The in-vehicle system 10-*i* holds the vehicle parameter PV-i of the vehicle 1-*i*. The in-vehicle system 10-*i* corrects (converts) the base trajectory TB to the target trajectory TR-i suitable for the vehicle 1-*i* in consideration of the vehicle parameter PV-i. That is, the in-vehicle system 10-*i* acquires the suitable target trajectory TR-i specific to the vehicle 1-*i* by correcting the base trajectory TB based on the vehicle parameter PV-i. The target trajectory TR-i specific to the vehicle 1-*i* is a trajectory that allows the vehicle 1-*i* to reach the destination more safely or more efficiently as compared with the case of the base trajectory TB.

Correcting the base trajectory TB includes changing a position and/or a shape of the base trajectory TB. For example, a curve section as shown in FIG. 2 is considered. In a case of a vehicle 1-*i* having a long vehicle length L or a long wheelbase WB, a difference between track followed by front and back inner wheels when turning becomes large. In this case, the in-vehicle system 10-*i* shifts the base trajectory TB to the outer side of the turning to generate the target trajectory TR-i that is safer as compared with the case of the base trajectory TB. On the other hand, a small vehicle 1-*i* is capable of turning in a small radius. In this case, the in-vehicle system 10-*i* may shift the base trajectory TB to the inner side of the turning to generate the target trajectory TR-i that is more efficient and has a shorter distance as compared with the base trajectory TB.

The in-vehicle system 10-*i* may generate the target trajectory TR-i in consideration of the roadway 2 and the obstacle 3. A configuration of the roadway 2 is obtained from map information of the predetermined area AR. Alternatively, the in-vehicle system 10-*i* may recognize the configuration of the roadway 2 based on the surrounding situation information indicating a result of recognition by the recognition sensor mounted on the vehicle 1-*i*. Examples of the obstacle 3 include a wall, a pillar, another vehicle, and the like. The in-vehicle system 10-*i* is able to recognize the obstacle 3 around the vehicle 1-*i* based on the surrounding situation information indicating the result of recognition by the recognition sensor mounted on the vehicle 1-*i*. An arrangement of stationary obstacles 3 such as the wall and the pillar can also be obtained from the map information of the predetermined area AR.

A condition that the target trajectory TR-i should at least satisfy is that the vehicle 1-*i* reaches the destination without protruding from the roadway 2 and without making contact with the obstacle 3. This condition is hereinafter referred to as a "first condition." The in-vehicle system 10-*i* acquires the target trajectory TR-i that satisfies the first condition.

More specifically, the in-vehicle system 10-*i* acquires the target trajectory TR-i satisfying the first condition by correcting the base trajectory TB based on the map information or the surrounding situation information in addition to the vehicle parameter PV-i.

Figure 4:
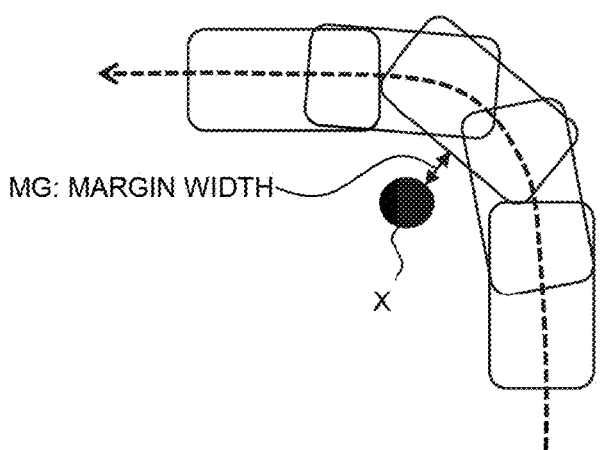
FIG. 4 is a conceptual diagram for explaining an example of correction of a base trajectory according to an embodiment.
Figure 4:
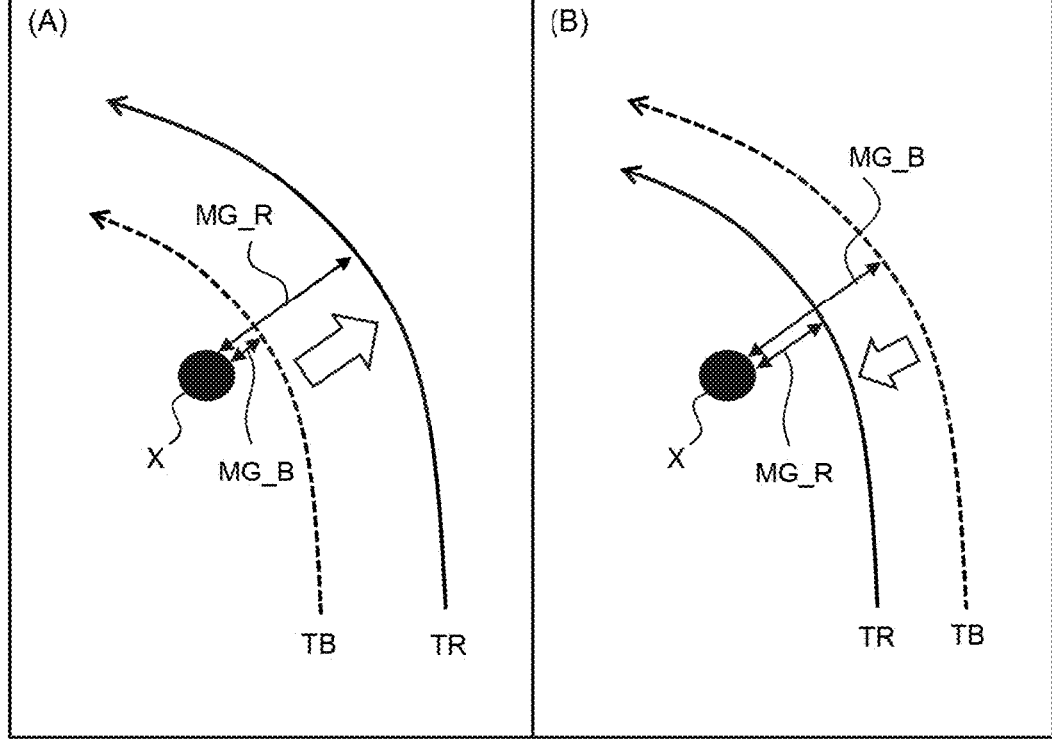

FIG. 4 is a conceptual diagram for explaining an example of correction of the base trajectory TB. The "X" in FIG. 4 denotes a boundary of the roadway 2 or the obstacle 3. A margin width MG is a minimum distance between the X and the passing region of the vehicle 1. When the vehicle 1 makes a turn, the margin width MG on the inner side of the turning is considered in particular. The passing region in a case where the vehicle 1 follows a certain trajectory can be estimated based on the certain trajectory and the vehicle parameter PV. Then, the margin width MG can be calculated based on the passing region and the map information or the surrounding situation information.

A base margin width MG_B is the margin width MG in the case of the base trajectory TB. That is, the base margin width MG_B is the margin width MG in the case where the vehicle 1 follows the base trajectory TB. On the other hand, a corrected margin width MG_R is the margin width MG in the case of the target trajectory TR obtained by correcting the base trajectory TB. That is, the corrected margin width MG_R is the margin width MG in the case where the vehicle 1 follows the target trajectory TR.

The in-vehicle system 10 calculates the base margin width MG_B based on the vehicle parameter PV, the base trajectory TB, and the map information or the surrounding situation information. Subsequently, the in-vehicle system 10 compares the base margin width MG_B with a threshold value. The threshold value is a minimum margin width MG required from a viewpoint of the safety.

When the base margin width MG_B is smaller than the threshold value (see example (A) in FIG. 4), the in-vehicle system 10 increases the margin width MG by shifting the base trajectory TB to the outer side of the turning. That is, the in-vehicle system 10 corrects the base trajectory TB to the target trajectory TR based on the vehicle parameter PV so that the margin width MG becomes equal to or larger than the threshold value. In other words, the in-vehicle system 10 corrects the base trajectory TB to acquire the target trajectory TR with which the corrected margin width MG_R is equal to or larger than the threshold value. This enables the vehicle 1 to arrive at the destination more safely than in the case of the base trajectory TB.

On the other hand, when the base margin width MG_B is larger than the threshold value (see example (B) in FIG. 4), the in-vehicle system 10 may reduce the margin width MG by shifting the base trajectory TB to the inner side of the turning as long as the first condition is satisfied. That is, the in-vehicle system 10 may correct the base trajectory TB to the target trajectory TR based on the vehicle parameter PV so that the margin width MG becomes smaller than the base margin width MG_B and equal to or larger than the threshold value. In other words, the in-vehicle system 10 may correct the base trajectory TB to acquire the target trajectory TR with which the corrected margin width MG_R is equal to or larger than the threshold value and is smaller than the base margin width MG_B. This enables the vehicle 1 to arrive at the destination more efficiently in a shorter distance than in the case of the base trajectory TB.

The in-vehicle system 10 controls the vehicle 1 so as to follow the target trajectory TR thus acquired. The vehicle 1 travels so as to follow the target trajectory TR and safely arrives at the destination.

It should be noted that there may be a case where no target trajectory TR satisfying the first condition is available. That is, there may be a case where the base trajectory TB cannot be corrected so as to satisfy the first condition. When there is no target trajectory TR satisfying the first condition, the in-vehicle system 10 may request the management system 100 to change the destination or the base trajectory TB. In response to the request, the management system 100 changes the destination (for example, the target parking space) allocated to the vehicle 1, and also changes the base trajectory TB in accordance with the change in the destination. Alternatively, the management system 100 may change the base trajectory TB toward the destination while maintaining the destination. In either case, it is expected that the target trajectory TR satisfying the first condition is found by changing the base trajectory TB.

2-3. Effects

As described above, according to the present embodiment, the target trajectory TR suitable at least for the vehicle 1 is acquired by taking into account the vehicle parameter PV that represents the individual characteristics of the vehicle 1. The target trajectory TR with which at least the vehicle 1 is able to safely reach the destination is acquired. The vehicle 1 is able to safely reach the destination in accordance with such the target trajectory TR.

Moreover, according to the present embodiment, the in-vehicle system 10 acquires the base trajectory TB that does not depend on the vehicle parameter PV. Then, the in-vehicle system 10 corrects the base trajectory TB based on the vehicle parameter PV, thereby acquiring the suitable target trajectory TR specific to the vehicle 1. Since the in-vehicle system 10 corrects the base trajectory TB to the target trajectory TR in consideration of the vehicle parameter PV, there is no need for the management system 100 outside the in-vehicle system 10 to consider the vehicle parameter PV. Therefore, the load on the management system 100 is reduced. That is to say, it is possible to distribute the load when acquiring the target trajectory TR suitable for the vehicle 1.

There is no need for the management system 100 to support a wide variety of vehicles 1 that use the predetermined area AR (for example, the parking lot PL). It is enough for the management system 100 to determine the base trajectory TB that does not depend on the vehicle parameter PV of the vehicle 1. The reason that the suitable target trajectory TR taking the vehicle parameter PV into account is determined on the side of the in-vehicle system 10. No huge target trajectory map and no complicated algorithm as in the case of the comparative example shown in FIG. 3 are required. Therefore, the processing load on the management system 100 is reduced.

The input data to the base trajectory map 200 used in the management system 100 include a pair of the point of departure and the destination of the vehicle 1, and do not include the vehicle parameter PV. Therefore, the base trajectory map 200 is simplified as compared with the target trajectory map in the case of the comparative example. This contributes to reduction of memory usage resources and reduction of processing load in the management system 100.

It is enough for the in-vehicle system 10 of each vehicle 1 to consider only the vehicle parameter PV of the each vehicle 1, and there is no need to consider vehicle parameters PV of other vehicles at all. The algorithm for correcting (converting) the base trajectory TB to the target trajectory TR in the in-vehicle system 10 may be specific to the vehicle 1. Since it is not necessary to cope with all kinds of vehicle parameter PV, the algorithm used in the in-vehicle system 10 is simplified. This leads to a reduction in the load on the in-vehicle system 10.

Furthermore, according to the present embodiment, there is no need to transmit the vehicle parameter PV from the vehicle 1 to the management system 100. Therefore, there is no restriction in terms of the communication standard. The in-vehicle system 10 is able to acquire the target trajectory TR in sufficient consideration of the vehicle parameter PV representing the individual characteristics of the vehicle 1. Since the accuracy of the target trajectory TR is improved, the accuracy of travel of the vehicle 1 in the predetermined area AR is improved.

3. Configuration Example of In-Vehicle System

Figure 5:
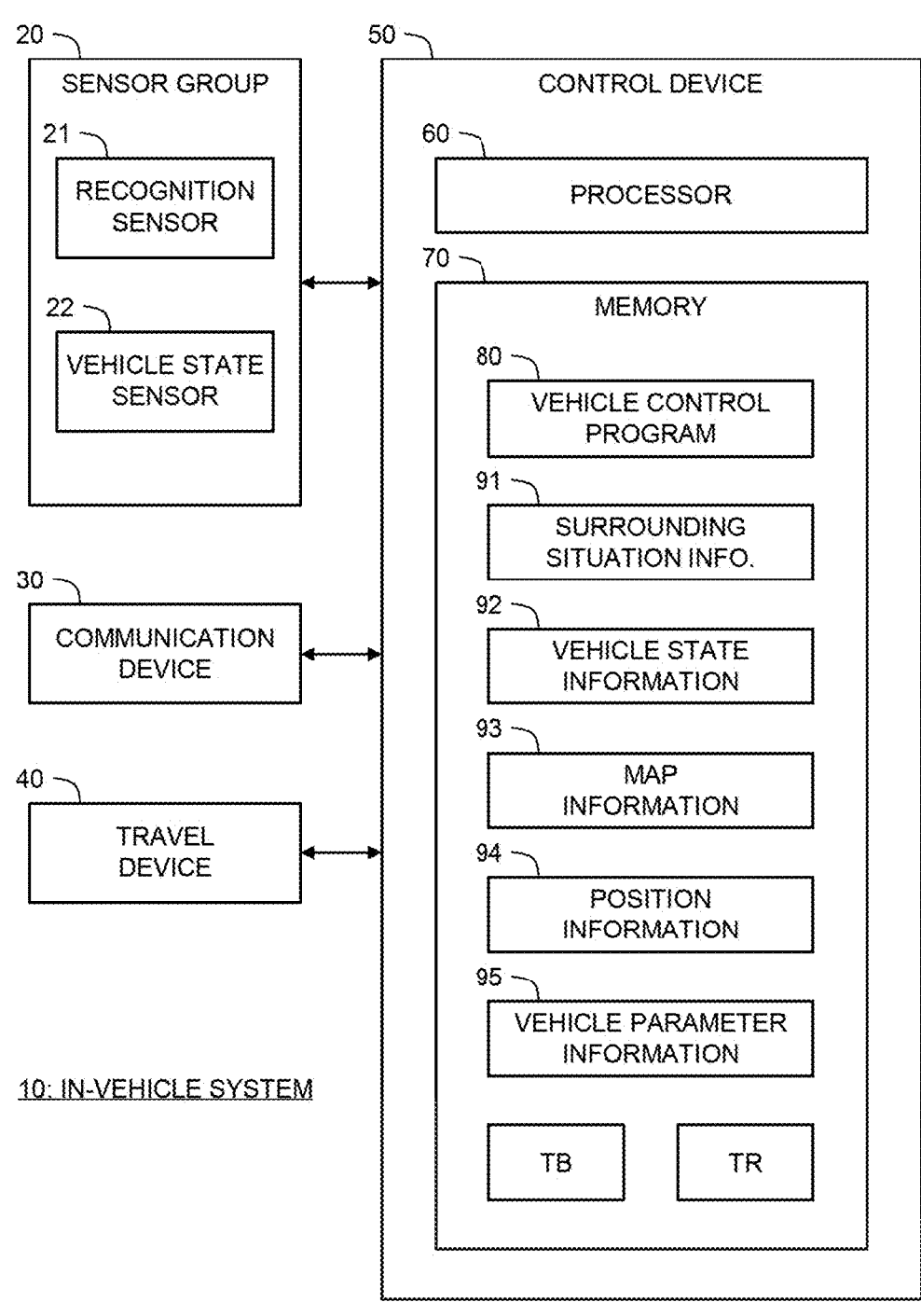
FIG. 5 is a block diagram showing an example of a configuration of an in-vehicle system according to an embodiment.

FIG. 5 is a block diagram showing an example of a configuration of the in-vehicle system 10. The in-vehicle system 10 includes a sensor group 20, a communication device 30, a travel device 40, and a control device 50.

The sensor group 20 includes a recognition sensor 21, a vehicle state sensor 22, and the like. The recognition sensor 21 is used to recognize (detect) a situation around the vehicle 1. Examples of the recognition sensor 21 include a camera, a laser imaging detection and ranging (LIDAR), a radar, and the like. The vehicle state sensor 22 includes a speed sensor, an accelerometer, a yaw rate sensor, a steering angle sensor, and the like.

The communication device 30 communicates with the outside via a communication network. For example, the communication device 30 communicates with the management system 100. Examples of the communication method include mobile communication such as 5G and wireless LANs.

The travel device 40 includes a steering device, a driving device, and a braking device. The steering device steers the wheels. For example, the steering device includes an electric power steering (EPS) device. The drive device is a power source that generates a driving force. Examples of the drive device include an engine, an electric motor, and an in-wheel motor. The braking device generates a braking force.

The control device (controller) 50 is a computer that controls the vehicle 1. The control device 50 includes one or more processors 60 (hereinafter, simply referred to as a processor 60 or processing circuitry) and one or more memories 70 (hereinafter, simply referred to as a memory 70). The processor 60 executes a variety of processing. For example, the processor 60 includes a central processing unit (CPU). The memory 70 stores a variety of information. Examples of the memory 70 include a volatile memory, a non-volatile memory, a hard disk drive (HDD), a solid state drive (SSD), and the like.

A vehicle control program 80 is a computer program for controlling the vehicle 1. The functions of the control device 50 may be implemented by a cooperation of the processor 60 executing the vehicle control program 80 and the memory 70. The vehicle control program 80 is stored in the memory 70. Alternatively, the vehicle control program 80 may be recorded on a non-transitory computer-readable recording medium.

The control device 50 executes a vehicle travel control for controlling the travel of the vehicle 1. The vehicle travel control includes steering control, acceleration control, and deceleration control. The control device 50 executes the vehicle travel control by controlling the travel device 40 (steering device, drive device, braking device).

The control device 50 acquires a variety of information. The variety of information is stored in the memory 70.

The surrounding situation information 91 indicates a result of recognition by the recognition sensor 21. The surrounding situation information 91 may include object information regarding an object recognized by the recognition sensor 21. Examples of the object around the vehicle 1 include the boundary of the roadway 2, the obstacle 3, the marker M, and the like. Examples of the obstacle 3 include a wall, a pillar, another vehicle, and the like. The object information indicates a relative position and a relative speed of the object with respect to the vehicle 1.

The vehicle state information 92 indicates the vehicle state detected by the vehicle state sensor 22.

The map information 93 is map information of the predetermined area AR in which the vehicle 1 travels. The map information 93 indicates the configuration of the roadway 2 in the predetermined area AR. In addition, the map information 93 indicates the arrangement of the stationary obstacles 3 (e.g., walls and pillars) in the predetermined area AR. Further, the map information 93 indicates the arrangement of the markers M in the predetermined area AR. For example, the map information 93 is provided from the management system 100 that manages the predetermined area AR. The control device 50 acquires the map information 93 from the management system 100 via the communication device 30.

The position information 94 indicates the current position of the vehicle 1 in the predetermined area AR. For example, the control device 50 acquires highly accurate position information 94 by performing the localization processing (localization). More specifically, the control device 50 calculates a rough position of the vehicle 1 in the predetermined area AR based on the vehicle state information 92 (steering angle and speed). The control device 50 recognizes the marker M in the vehicle 1 by using the recognition sensor 21. The control device 50 acquires the arrangement information of the markers M around the vehicle 1 from the map information 93. The control device 50 corrects the position of the vehicle 1 by matching the recognition result of the marker M with its arrangement. As a result, highly accurate position information 94 is obtained.

The vehicle parameter information 95 indicates the vehicle parameter PV of the vehicle 1. The vehicle parameter information 95 is stored in the memory 70 in advance.

The control device 50 communicates with the management system 100 via the communication device 30. The control device 50 receives, from the management system 100, information of the base trajectory TB to the destination in the predetermined area AR. Then, the control device 50 corrects the base trajectory TB based on the vehicle parameter PV indicated by the vehicle parameter information 95, thereby acquiring the suitable target trajectory TR specific to the vehicle 1.

For example, the first condition is that the vehicle 1 arrives at the destination without protruding from the roadway 2 and without making contact with the obstacle 3. The control device 50 corrects the base trajectory TB based on the vehicle parameter PV and the surrounding situation information 91 or the map information 93, thereby acquiring the target trajectory TR that satisfies the first condition.

Then, the control device 50 performs the vehicle travel control so that the vehicle 1 follows the target trajectory TR. More specifically, the control device 50 performs the vehicle travel control based on the position of the vehicle 1 indicated by the position information 94 and the target trajectory TR so that the vehicle 1 follows the target trajectory TR.

4. Configuration Example of Management System

Figure 6:
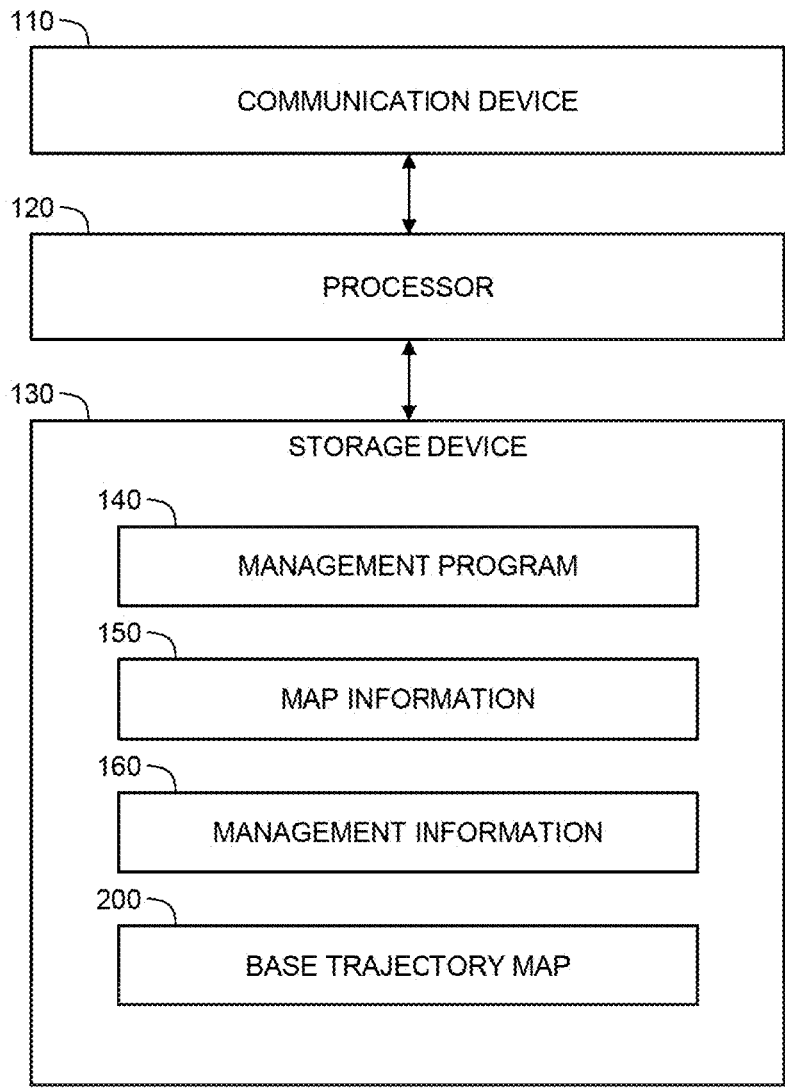
FIG. 6 is a block diagram showing an example of a configuration of a management system according to an embodiment.

FIG. 6 is a block diagram illustrating an example of a configuration of the management system 100. The management system 100 includes a communication device 110, one or more processors 120 (hereinafter referred to as a processor 120 or processing circuitry), and one or more storage devices 130 (hereinafter referred to as a storage device 130).

The communication device 110 communicates with the in-vehicle system 10 of each vehicle 1. The processor 120 executes a variety of processing. For example, the processor 120 includes a CPU. The storage device 130 stores a variety of information. Examples of the storage device 130 include a volatile memory, a non-volatile memory, an HDD, an SSD, and the like.

A management program 140 is a computer program for managing the predetermined area AR. The functions of the management system 100 may be implemented by a cooperation of the processor 120 executing the management program 140 and the storage device 130. The management program 140 is stored in the storage device 130. The management program 140 may be recorded on a non-transitory computer-readable recording medium.

The storage device 130 stores map information 150 of the predetermined area AR. The map information 150 is the same as the map information 93 described above. The processor 120 may provide the map information 150 to the in-vehicle system 10 via the communication device 110.

The storage device 130 also stores management information 160 for managing the predetermined area AR. For example, when the predetermined area AR is a parking lot PL, the management information 160 indicates a use situation (an empty situation) of parking spaces in the parking lot PL. The processor 120 is able to allocate an empty parking space (destination) to the vehicle 1 based on the management information 160.

The storage device 130 also stores a base trajectory map 200. The input data to the base trajectory map 200 is a pair of the point of departure and the destination of the vehicle 1, and does not include the vehicle parameter PV. The base trajectory map 200 indicates a correspondence relationship between the input data and the base trajectory TB. That is, the base trajectory map 200 is configured to output the base trajectory TB from the point of departure to the destination (for example, the target parking space) in the predetermined area AR.

The processor 120 inputs the pair of the point of departure and the destination of the vehicle 1 to the base trajectory map 200, thereby obtaining the base trajectory TB that does not depend on the vehicle parameter PV. The processor 120 transmits the information of the base trajectory TB to the in-vehicle system 10 vehicle 1 via the communication device 110.

What is claimed is:

1. An in-vehicle system mounted on an autonomous vehicle, comprising:
   processing circuitry configured to acquire a target trajectory of the autonomous vehicle to a destination in a predetermined area; and
   one or more memories configured to store information of a vehicle parameter contributing to a passing region of the autonomous vehicle, wherein the processing circuitry is further configured to:
   acquire information on a base trajectory that is a trajectory to the destination in the predetermined area and does not depend on the vehicle parameter;
   acquire the target trajectory specific to the autonomous vehicle by correcting the base trajectory based on the vehicle parameter; and
   control the autonomous vehicle to travel to the destination in the predetermined area along the target trajectory.

2. The in-vehicle system according to claim 1, wherein
the base trajectory is generated by a management system that manages the predetermined area, and
the processing circuitry is further configured to communicate with the management system to acquire the information on the base trajectory from the management system.

3. The in-vehicle system according to claim 1, wherein
the one or more memories are further configured to store map information of the predetermined area or surrounding situation information indicating a result of recognition by a recognition sensor mounted on the autonomous vehicle,
a first condition includes that the autonomous vehicle reaches the destination without protruding from a roadway and without making contact with an obstacle, and
the processing circuitry is further configured to acquire the target trajectory satisfying the first condition by correcting the base trajectory based on the map information or the surrounding situation information in addition to the vehicle parameter.

4. The in-vehicle system according to claim 3, wherein
a margin width is a minimum distance between a boundary of the roadway or the obstacle and the passing region of the autonomous vehicle, and
the processing circuitry is further configured to:
   calculate a base margin width that is the margin width in a case of the base trajectory, based on the vehicle parameter and the base trajectory;
   when the base margin width is smaller than a threshold value, correct the base trajectory to the target trajectory based on the vehicle parameter so that the margin width becomes equal to or larger than the threshold value; and
   when the base margin width is larger than the threshold value, correct the base trajectory to the target trajectory based on the vehicle parameter so that the margin width becomes smaller than the base margin width and equal to or larger than the threshold value.

5. The in-vehicle system according to claim 3, wherein
the base trajectory is generated by a management system that manages the predetermined area,
the processing circuitry is further configured to communicate with the management system to acquire the information on the base trajectory from the management system, and
when the target trajectory satisfying the first condition is not available, the processing circuitry is further configured to request the management system to change the destination or the base trajectory.

* * * * *